US008914015B2

(12) United States Patent
Kim et al.

(10) Patent No.: US 8,914,015 B2
(45) Date of Patent: Dec. 16, 2014

(54) GROUPING OF USERS FOR MIMO TRANSMISSION IN A WIRELESS COMMUNICATION SYSTEM

(75) Inventors: Byoung-Hoon Kim, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1483 days.

(21) Appl. No.: 11/686,951

(22) Filed: Mar. 15, 2007

(65) Prior Publication Data
US 2007/0223423 A1 Sep. 27, 2007

Related U.S. Application Data

(60) Provisional application No. 60/784,837, filed on Mar. 20, 2006, provisional application No. 60/785,601, filed on Mar. 24, 2006.

(51) Int. Cl.
| | |
|---|---|
| *H04M 3/00* | (2006.01) |
| *H04L 1/06* | (2006.01) |
| *H04B 7/04* | (2006.01) |
| *H04L 1/00* | (2006.01) |
| *H04B 7/06* | (2006.01) |

(52) U.S. Cl.
CPC ............ *H04B 7/0452* (2013.01); *H04L 1/0026* (2013.01); *H04L 1/06* (2013.01); *H04L 1/002* (2013.01); *H04L 1/0035* (2013.01); *H04L 1/0015* (2013.01); *H01L 1/0009* (2013.01); *H04B 7/0632* (2013.01); *H04L 1/0025* (2013.01); *H04B 7/0665* (2013.01); *H04B 7/0417* (2013.01)
USPC .......................... 455/419; 375/144; 370/395.4

(58) Field of Classification Search
CPC ....... H04L 1/06; H04L 1/0003; H04L 1/1812; H04L 5/0094; H04L 1/0026; H04L 1/1854; H04L 1/1887; H04L 5/0057; H04L 5/0092; H04B 7/0632; H04B 7/0639; H04B 7/0452; H04B 7/063; H04W 72/08
USPC ......... 370/395.2, 395.43, 322, 329, 335, 543, 370/536, 341, 431, 437, 443, 464, 395.4, 370/319; 455/450–452.2, 464, 516, 158.1, 455/166.2, 419; 375/144
See application file for complete search history.

(56) References Cited

U.S. PATENT DOCUMENTS

| | | | | |
|---|---|---|---|---|
| 2004/0001429 | A1* | 1/2004 | Ma et al. ........................ | 370/210 |
| 2004/0013089 | A1* | 1/2004 | Taneja et al. .................. | 370/235 |

(Continued)

FOREIGN PATENT DOCUMENTS

| | | |
|---|---|---|
| CN | 1717888 | 1/2006 |
| JP | 2007512731 A | 5/2007 |

(Continued)

OTHER PUBLICATIONS

International Search Report—PCT/US07/064329, International Search Authority—European Patent Office, Aug. 2, 2007.

(Continued)

*Primary Examiner* — Olumide T Ajibade Akonai
*Assistant Examiner* — Edward Zhang
(74) *Attorney, Agent, or Firm* — Kenyon S. Jenckes

(57) ABSTRACT

Techniques for supporting MIMO transmission are described. User equipments (UEs) are classified into a first group of UEs to be scheduled individually and a second group of UEs that can be scheduled together. The classification may be based upon the number of transmit and receive antennas, sector loading, data requirements, long-term channel statistics, the number of UEs, etc. Channel quality indicator (CQI) information received from the UEs is interpreted in different manners depending on the groups to which the UEs belong. A single UE may be selected at a time from the first group or multiple UEs may be selected at a time from the second group for MIMO transmission. A MIMO transmission may be sent to a single UE in the first group or multiple UEs in the second group at rates selected based upon the CQI information.

55 Claims, 5 Drawing Sheets

(56) References Cited

U.S. PATENT DOCUMENTS

| | | | |
|---|---|---|---|
| 2004/0102202 A1* | 5/2004 | Kumaran et al. | 455/515 |
| 2004/0114618 A1* | 6/2004 | Tong et al. | 370/431 |
| 2004/0228349 A1* | 11/2004 | Vrzic et al. | 370/395.4 |
| 2005/0043031 A1* | 2/2005 | Cho et al. | 455/450 |
| 2005/0101259 A1 | 5/2005 | Tong et al. | |
| 2005/0111406 A1 | 5/2005 | Pasanen et al. | |
| 2005/0111462 A1* | 5/2005 | Walton et al. | 370/395.4 |
| 2006/0182191 A1* | 8/2006 | Darwood et al. | 375/267 |
| 2006/0209980 A1* | 9/2006 | Kim et al. | 375/267 |
| 2007/0047552 A1* | 3/2007 | Astely | 370/395.4 |
| 2007/0171808 A1* | 7/2007 | Wu et al. | 370/208 |

FOREIGN PATENT DOCUMENTS

| | | |
|---|---|---|
| JP | 2007536858 A | 12/2007 |
| RU | 2197791 | 1/2003 |
| RU | 2288538 | 11/2006 |
| WO | 2004038984 | 5/2004 |
| WO | 2005057810 | 6/2005 |
| WO | 2005060123 | 6/2005 |
| WO | 2005062497 A1 | 7/2005 |
| WO | 2005109717 A1 | 11/2005 |

OTHER PUBLICATIONS

Written Opinion—PCT/US07/064329, International Searching Authority—European Patent Office, Aug. 2, 2007.

Taiwanese Search report—096109561—TIPO—Jan. 26, 2011.

* cited by examiner

GROUPING OF USERS FOR MIMO TRANSMISSION IN A WIRELESS COMMUNICATION SYSTEM

The present application claims priority to provisional U.S. Application Ser. No. 60/784,837, entitled "A Method of Grouping Access Terminals in a MIMO System," filed Mar. 20, 2006, and Ser. No. 60/785,601, entitled "A Method of Grouping UEs in a MIMO System," filed Mar. 24, 2006, both assigned to the assignee hereof and incorporated herein by reference.

BACKGROUND

I. Field

The present disclosure relates generally to communication, and more specifically to data transmission in a wireless communication system.

II. Background

Wireless communication systems are widely deployed to provide various communication services such as voice, packet data, broadcast, messaging, etc. Those systems may be multiple-access systems capable of supporting communication for multiple users by sharing the available system resources, e.g., bandwidth and transmit power. Examples of such multiple-access systems include Code Division Multiple Access (CDMA) systems, Time Division Multiple Access (TDMA) systems, Frequency Division Multiple Access (FDMA) systems, and Orthogonal FDMA (OFDMA) systems.

A wireless multiple-access system includes Node Bs (or base stations) that can communicate with user equipments (UEs). Each UE may communicate with one or more Node Bs via transmissions on the downlink and uplink. The downlink (or forward link) refers to the communication link from the Node Bs to the UEs, and the uplink (or reverse link) refers to the communication link from the UEs to the Node Bs.

A wireless multiple-access system may support multiple-input multiple-output (MIMO) transmission on the downlink and/or uplink. On the downlink, a Node B may send a MIMO transmission from multiple (T) transmit antennas at the Node B to multiple (R) receive antennas at one or more UEs. A MIMO channel formed by the T transmit and R receive antennas may be decomposed into C spatial channels, where $C \leq \min\{T, R\}$. Each of the C spatial channels corresponds to a dimension. Improved performance (e.g., higher throughput and/or greater reliability) may be achieved by exploiting the additional dimensionalities created by the multiple transmit and receive antennas.

There is therefore a need in the art for techniques to efficiently support MIMO transmission in a wireless multiple-access system.

SUMMARY

Techniques for supporting MIMO transmission to a single UE or user as well as to multiple UEs are described herein. In one aspect, UEs are classified into a plurality of groups comprising a first group and a second group. The first group may include UEs to be scheduled individually. The second group may include UEs that can be scheduled together. The classification of the UEs may be based upon various criteria such as, e.g., the number of antennas at a UE and the number of antennas at a Node B, loading at the Node B, data requirements of the UEs, long-term channel statistics, the number of UEs, etc. The classification may be semi-static. Changes in operating conditions may be detected, and UEs may be reclassified based upon the detected changes. A single UE may be selected at a time from the first group for MIMO transmission, e.g., on a given frequency resource. Multiple UEs may be selected at a time from the second group for MIMO transmission, e.g., on the given frequency resource. A MIMO transmission may be sent to a single UE in the first group or multiple UEs in the second group, e.g., on the given frequency resource using one or more columns of a precoding matrix selected by the UE(s) or reconstructed by the Node B based on matrices and/or columns selected by the UE(s).

In another aspect, channel quality indicator (CQI) information is interpreted based upon the UE classification. CQI information received from the UEs in the first group may be interpreted in accordance with a first interpretation, e.g., with the total transmit power at the Node B being distributed across a selected number of data streams and/or with successive interference cancellation (SIC) being used by the UEs. CQI information received from the UEs in the second group may be interpreted in accordance with a second interpretation, e.g., with the total transmit power being distributed across a maximum number of data streams and/or without SIC. Rates for MIMO transmission to one or more UEs are selected based upon the interpretation of the CQI information received from the UE(s).

Various aspects and features of the disclosure are described in further detail below.

DETAILED DESCRIPTION

Figure 1:
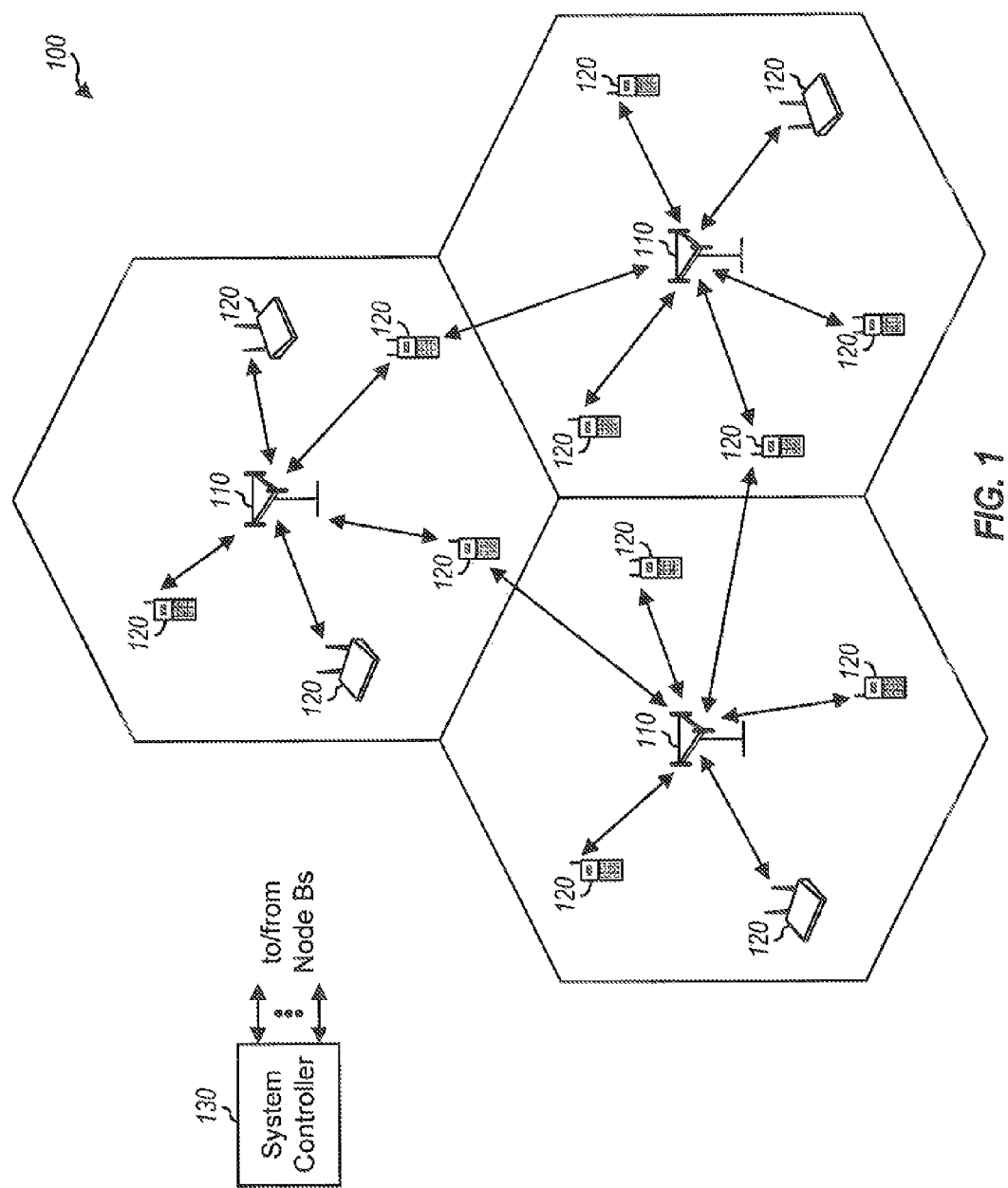
FIG. 1 shows a wireless multiple-access communication system.

FIG. 1 shows a wireless multiple-access communication system 100 with multiple Node Bs 110. A Node B is generally a fixed station that communicates with the UEs and may also be referred to as a base station, an access point, an enhanced Node B (eNode B), etc. Each Node B 110 provides communication coverage for a particular geographic area. The term "cell" can refer to a Node B and/or its coverage area depending on the context in which the term is used. To improve system capacity, a Node B coverage area may be partitioned into multiple smaller areas, e.g., three smaller areas. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the Node B for the cell.

UEs 120 may be dispersed throughout the system. A UE may be stationary or mobile and may also be referred to as a mobile station (MS), a mobile equipment (ME), a terminal, an access terminal (AT), a station (STA), etc. A UE may be a cellular phone, a personal digital assistant (PDA), a wireless modem, a wireless communication device, a subscriber unit, etc. The terms "UE" and "user" may be used interchangeably.

A system controller 130 may couple to Node Bs 110 and provide coordination and control for these Node Bs. System controller 130 may be a single network entity or a collection of network entities.

Figure 2:
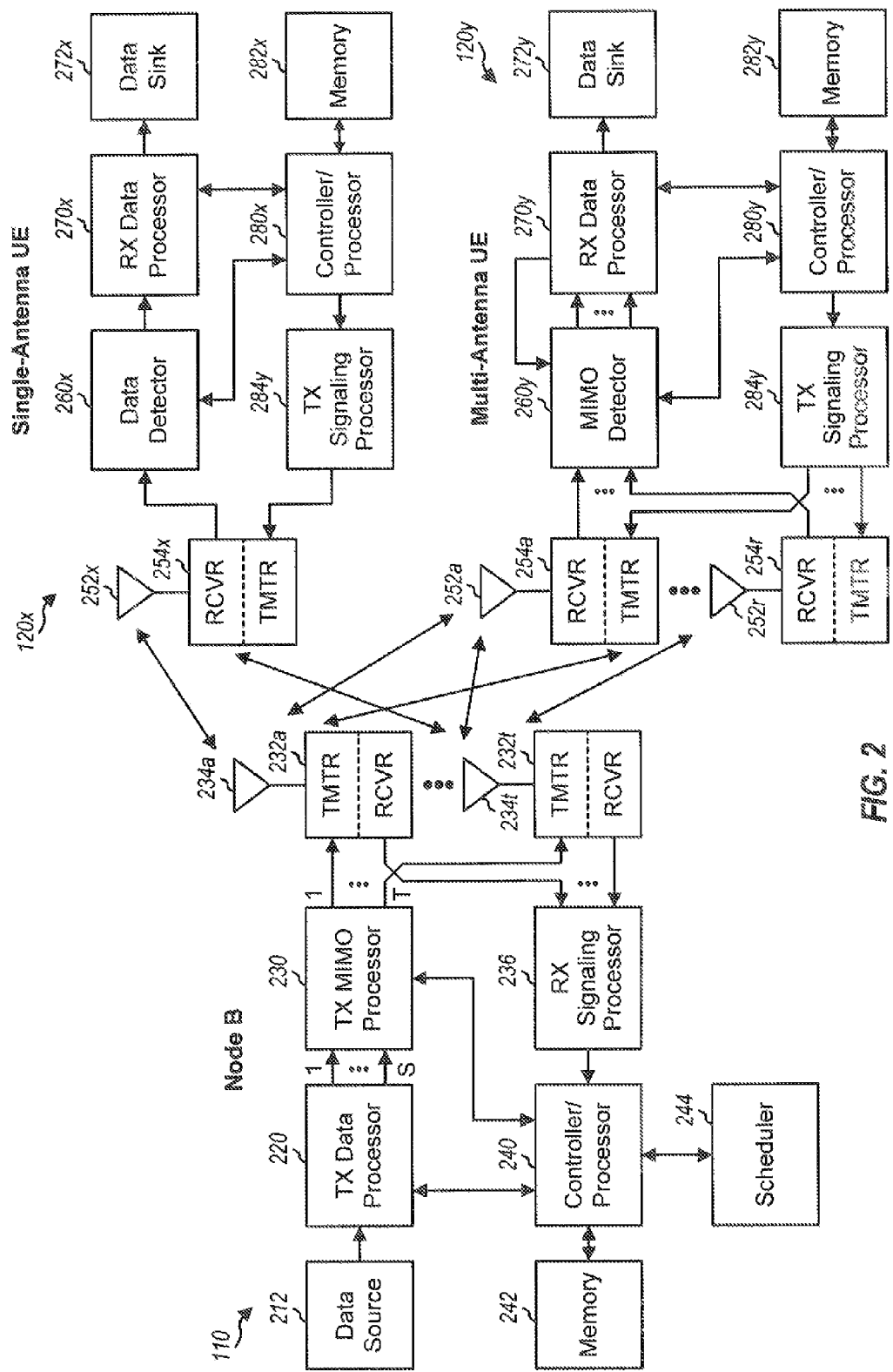
FIG. 2 shows a block diagram of a Node B and two UEs.

FIG. 2 shows a block diagram of one Node B 110 and two UEs 120x and 120y in system 100. Node B 110 is equipped with multiple (T>1) antennas 234a through 234t. UE 120x is equipped with a single (R=1) antenna 252x. UE 120y is equipped with multiple (R>1) antennas 252a through 252r. Each antenna may be a physical antenna or an antenna array. For simplicity, FIG. 2 shows only the processing units for data transmission oil the downlink and signaling transmission on the uplink.

At Node B 110, a transmit (TX) data processor 220 receives traffic data from a data source 212 for one or more UEs being served. Processor 220 processes (e.g., formats, encodes, interleaves, and symbol maps) the traffic data and generates data symbols. Processor 220 also generates and multiplexes pilot symbols with the data symbols. As used herein, a data symbol is a symbol for data, a pilot symbol is a symbol for pilot, and a symbol is typically a complex value. The data symbols and pilot symbols may be modulation symbols from a modulation scheme such as PSK or QAM. Pilot is data that is known a priori by both the Node B and the UEs.

A TX MIMO processor 230 performs transmitter spatial processing on the data and pilot symbols. Processor 230 may perform direct MIMO mapping, precoding, beamforming, etc. A data symbol may be sent from one antenna for direct MIMO mapping or from multiple antennas for precoding and beamforming. Processor 230 provides T output symbol streams to T transmitters (TMTRs) 23a through 232t. Each transmitter 232 may perform modulation (e.g., for OFDM, CDMA, etc.) on the output symbols to obtain output chips. Each transmitter 232 further processes (e.g., converts to analog, filters, amplifies and upconverts) its output chips and generates a downlink signal. T downlink signals from transmitters 232a through 232t are transmitted from T antennas 234a through 234t, respectively.

At each UE 120, one or multiple antennas 252 receive the downlink signals from Node B 110. Each antenna 252 provides a received signal to a respective receiver (RCVR) 254. Each receiver 254 processes (e.g., filters, amplifies, downconverts, and digitizes) its received signal to obtain samples. Each receiver 254 may also perform demodulation (e.g., for OFDM, CDMA, etc.) on the samples to obtain received symbols.

For single-antenna UE 120x, a data detector 260x performs data detection (e.g., matched filtering or equalization) on the received symbols and provides data symbol estimates. A receive (RX) data processor 270x then processes (e.g., symbol demaps, deinterleaves, and decodes) the data symbol estimates and provides decoded data to a data sink 272x. For multi-antenna UE 120y, a MIMO detector 260y performs MIMO detection on the received symbols and provides data symbol estimates. An RX data processor 270y then processes the data symbol estimates and provides decoded data to a data sink 272y.

UEs 120x and 120y may send feedback information to Node B 110, which may use the feedback information to schedule and transmit data to the UEs. The feedback information may also be referred to as channel state information (CSI), link adaptation information, etc. The feedback information may convey various types of information, as described below. For each UE, a TX signaling processor 284 receives feedback information from a controller/processor 280 and processes the feedback information in accordance with a selected signaling scheme. The processed signaling is conditioned by one or more transmitters 254 and transmitted via one or more antennas 252. At Node B 110, the uplink signals from UEs 120x and 120y are received by antennas 234a through 234t, processed by receivers 232a through 232t and further processed by an RX signaling processor 236 to recover the feedback information sent by the UEs. A scheduler 244 schedules UEs for transmission, e.g., based upon the received feedback information. A controller/processor 240 controls data transmission to the scheduled UEs based upon the received feedback information.

Controllers/processors 240, 280x and 280y may also control the operation of various processing units at Node B 110 and UEs 120x and 120y, respectively. Memories 242, 282x and 282y store data and program codes for Node B 110 and UEs 120x and 120y, respectively.

A Node B may support single-input single-output (SISO), single-input multiple-output (SIMO), multiple-input single-output (MISO), and/or multiple-input multiple-output (MIMO) transmissions. Single-input refers to one transmit antenna and multiple-input refers to multiple transmit antennas for data transmission. Single-output refers to one receive antenna and multiple-output refers to multiple receive antennas for data reception. For the downlink, the multiple receive antennas may be for one or more UEs. The Node B may also support single-user MIMO (SU-MIMO) and multi-user MIMO (MU-MIMO). SU-MIMO refers to MIMO transmission to a single UE on a given set of time and frequency resources. MU-MIMO refers to MIMO transmission to multiple UEs on the same set of time and frequency resources. MU-MIMO is also referred to as Spatial Division Multiple Access (SDMA). The Node B may transmit data using SU-MIMO on some time and frequency resources (e.g., in some time intervals) and may transmit data using MU-MIMO on some other time and frequency resources (e.g., in some other time intervals). The Node B may also support space-time transmit diversity (STTD), space-frequency transmit diversity (SFTD), and/or other transmission schemes.

The Node B may send a MIMO transmission to one or more UEs using direct MIMO mapping, precoding, or beamforming. With direct MIMO mapping, each data stream is mapped to a different transmit antenna. With precoding, the data streams are multiplied with a precoding matrix and then sent on virtual antennas formed with the precoding matrix. Each data stream is sent from all T transmit antennas. Precoding allows the total transmit power for each transmit antenna to be used for data transmission regardless of the number of data streams being sent. Precoding may also include spatial spreading, space-time scrambling, etc. With beamforming, the data streams are multiplied with a beamforming matrix and steered toward specific UE(s). For clarity, the following description assumes the use of precoding for both SU-MIMO and MU-MIMO.

The Node B may perform precoding for a MIMO transmission to one or more UEs, as follows:

$$x = Ps, \qquad \text{Eq (1)}$$

where s is an S×1 vector of data symbols for one or more UEs being served,

P is a T×S precoding matrix, and x is a T×1 vector of output symbols to be sent by the Node B.

S is the number of data streams being sent simultaneously to all UE(s) being served. S may be given as $1 \leq S \leq \min\{T, R\}$ for SU-MIMO and $1 \leq S \leq T$ for MU-MIMO. Each data symbol in vector s is multiplied by a corresponding column of matrix P and mapped to all or a subset of the T transmit antennas. For SU-MIMO, precoding may be used to spatially separate the S data streams being sent simultaneously to a single UE. For MU-MIMO, precoding may be used to spatially separate multiple UEs being served simultaneously. The terms precoding and beamforming are sometimes used interchangeably.

Precoding may be supported in various manners. In one design, the Node B supports a single T×T precoding matrix that may or may not be known to the UEs, e.g., depending on how pilot symbols are sent. In another design, the Node B supports a set of (e.g., 2, 4, 8, 16, 32 64, etc.) T×T precoding matrices that is known to the UEs. In this design, each UE may select a precoding matrix that can provide good performance for that UE from the set of precoding matrices and may send the selected precoding matrix to the Node B. P may be the precoding matrix selected by the UE(s) being served or may be reconstructed by the Node B based on matrices and/or columns selected by the UE(s). For both designs, each UE may identify one or more specific columns of the known or selected precoding matrix, which can provide good performance, and may send the selected columns(s) to the Node B. The set of selected columns(s) is also referred to as an antenna subset. For SU-MIMO, a UE may select S columns of a precoding matrix. For MU-MIMO, a UE may select L columns of a precoding matrix, where $1 \leq L \leq S$. For both SU-MIMO and MU-MIMO, P contains S columns that may be either selected by the one or more UEs being served or reconstructed by the Node B based on the matrices and/or columns selected by the UE(s). The Node B may send one or more data streams to each UE using the one or more columns of the precoding matrix.

For SU-MIMO, the MIMO transmission is sent to a single UE. The received symbols for this UE may be expressed as:

$$y = HPs + n,\qquad\text{Eq (2)}$$

where H an R×T channel response matrix for the UE,
y is an R×1 vector of received symbols for the UE, and
n is an R×1 noise vector.

For MU-MIMO, the MIMO transmission is sent to multiple UEs. The received symbols for a given UE i may be expressed as:

$$y_i = H_i P_i s_i + \underline{n}_i,\text{ and}\qquad\text{Eq (3)}$$

$$\underline{n}_i = H_i \sum_{j \neq i} P_j s_j + n,\qquad\text{Eq (4)}$$

where $s_i$ is an L×1 vector of data symbols for UE i,
$P_i$ is a T×L sub-matrix of precoding matrix P for UE i,
$H_i$ is an R×T channel response matrix for UE i,
$y_i$ is an R×1 vector of received symbols for UE i, and
$n_i$ is an R×1 noise vector for UE i.

L is the number of data streams being sent to UE i. The same or different numbers of data streams may be sent to the multiple UEs being served simultaneously with MU-MIMO. $P_i$ may contain L columns of the precoding matrix selected by UE i and is a sub-matrix of P. The Node B may send data to multiple UEs that select different columns of the same precoding matrix P. Alternatively, the Node B may send data to multiple UEs using a reconstructed precoding matrix (such as a zero-forcing matrix) based on the matrices and/or columns selected by the UEs. The noise observed by UE i includes background noise n as well as interference from the data streams sent to other UEs, as shown in equation (4).

For both SU-MIMO and MU-MIMO, a UE may recover its data streams using various MIMO detection techniques such as linear minimum mean square error (MMSE), zero-forcing (ZF), successive interference cancellation (SIC), etc., which are known in the art. SIC entails recovering one data stream at a time, estimating the interference due to each recovered data stream, and canceling the interference prior to recovering the next stream. SIC may improve the received signal qualities of data streams that are recovered later. For SU-MIMO, a UE may be able to perform SIC for all S data streams sent in the MIMO transmission. For MU-MIMO, a UE may be able to perform SIC for only the L data streams sent to that UE. The MU-MIMO UE is typically unable to recover the data streams sent to other UEs mid would not be able to estimate and cancel the interference due to these data streams. The MU-MIMO UE may thus perform (a) MMSE detection to recover its L data streams or (b) SIC to suppress the interference from the L data streams for that UE and MMSE detection to suppress the interference from the S-L data streams for the other UEs.

A UE may send feedback information to the Node B. The feedback information may include:
  A selected precoding matrix,
  One or more selected columns of the selected precoding matrix, and
  CQI information for all data streams.

The CQI information may convey received signal quality or rate for each data stream, a vector of rates for all data streams, and/or other information. Received signal quality may be quantified by signal-to-noise ratio (SNR), signal-to-interference-and-noise, ratio (SINR), carrier-to-interference ratio (C/I) etc. In the following description, SNR is used to denote received signal quality. The SNR of a data stream may be used to select a rate for that data stream. A rate may indicate a coding scheme or code rate, a modulation scheme, a transmission scheme, a data rate, and so on to use for a data stream. A rate may also be called a modulation and coding scheme (MCS).

The feedback information allows the Node B to adapt the MIMO transmission to varying channel conditions on the downlink. The feedback information for SU-MIMO may be the same as, or different from, the feedback information for MU-MIMO. For example, if precoding is not performed for SU-MIMO, then there is no need to send back a selected precoding matrix or one or more selected columns. As another example, a single precoding matrix may be used for SU-MIMO whereas a set of precoding matrices may be used for MU-MIMO. In this case, there is no need to send back the selected precoding matrix for SU-MIMO. In yet another example, the number of available precoding matrices for SU-MIMO may be smaller than the number of available precoding matrices for MU-MIMO. In yet another example, a single precoding vector may be used for MU-MIMO whereas multiple column vectors of a precoding matrix may be used for SU-MIMO. In this case, the uplink CQI overhead for MU-MIMO may be less than the uplink CQI overhead for SU-MIMO. In general, the uplink precoding overhead for SU-MIMO may be the same as, less than, or possibly greater than the precoding overhead for MU-MIMO.

The Node B may send signaling to indicate the rate/MCS used for each data stream. The signaling may also indicate the precoding matrix used for transmission. If pilot is not precoded in the same manner as data, then the Node B may convey the precoding matrix, and a UE may obtain a precoded MIMO channel response estimate by applying the precoding matrix. Alternatively, the pilot may be precoded in the same manner as data, in which case it may not be necessary to convey the precoding matrix used for transmission.

Table 1 lists different types of transmission that may be sent by the Node B to a UE based upon the number transmit antennas at the Node B and number of receive antennas at the UE. For the case with one transmit antenna, or T=1, the Node B may send (a) a SISO transmission if the UE has one receive antenna or (b) a SIMO transmission if the UE has multiple receive antennas. For the case with multiple transmit antennas, or T≥2, the Node B may send (a) a MIMO transmission to just this UE using SU-MIMO (or SU-MISO when R=1) or (b) a MIMO transmission to this UE and one or more other lies using MU-MIMO.

TABLE 1

|  | R = 1 | R ≥ 2 |
| --- | --- | --- |
| T = 1 | SISO | SIMO |
| T ≥ 2 | SU-MIMO or MU-MIMO | SU-MIMO or MU-MIMO |

SU-MIMO and MU-MIMO have some different characteristics in terms of data transmission and reception. Table 2 lists some of the differences between SU-MIMO and MU-MIMO. In Table 2, T is the number of transmit antennas at the Node B, R is the number of receive antennas at one UE, and M is the maximum number of data streams for all UEs.

TABLE 2

| Attribute | SU-MIMO | MU-MIMO |
| --- | --- | --- |
| Streams per UE | 1 ≤ S ≤ min{T, R} | 1 ≤ L ≤ min{T, R} |
| Maximum number of streams | M = min{T, R} | M = T |
| Goal | Higher peak rate for UE. | Higher sector capacity. |
| CQI generation | Rank selection is applicable and SIC may be used for all S data streams. | Rank selection is not applicable and SIC may be used for L data streams sent to the UE. |

For SU-MIMO, data is sent to only one UE, and the maximum number of data streams (M) is equal to the smaller of T and R. Even if R≥T and the MIMO channel is not rank deficient, the highest rates that may be used for the M data streams are determined by the spatial channels (or eigenmodes) of the MIMO channel for the scheduled UE. A main goal of SU-MIMO may be to increase the peak rate for the UE being served.

For MU-MIMO, the maximum number of data streams for all scheduled UEs is equal to T. Hence, when T>R, more data streams may be sent with MU-MIMO than SU-MIMO. Furthermore, the data streams may be sent on the better spatial channels for each scheduled UE, and higher rates may be used for these data streams. In addition, spatial diversity may be exploited to schedule spatially compatible UEs for transmission. If the signaling overhead is not considered, then the overall throughput or sector capacity for MU-MIMO represents an upper bound on the sector capacity for SU-MIMO. A main goal of MU-MIMO may be to increase sector capacity.

For SU-MIMO, a UE may estimate the MIMO channel response, evaluate different precoding matrices that can be used, determine the channel rank or number of data streams (S) to send to the UE, and send feedback information to the Node B. The feedback information may convey the selected precoding matrix, S specific columns of the selected precoding matrix, the SNR or rate for each data stream, and/or other information. The Node B may send S data streams to the UE using the S selected columns of the selected precoding matrix and at S rates indicated by the feedback information.

For MU-MIMO, a UE may estimate its MIMO or MISO channel response, evaluate different precoding matrices that can be used, and send feedback information to the Node B. The feedback information may convey the selected precoding matrix, one or more specific columns of the selected precoding matrix, the SNR or rate for each data stream, and/or other information. The number of columns to report may be fixed, e.g., by the number of antennas at the UE or to a predetermined value (e.g., one). The Node B may select spatially separable UEs based upon the feedback information received from different UEs, e.g. UEs that select different columns or the same precoding matrix, or UEs that select column vectors that have low correlation values with each other. The Node B may then send S data streams to these UEs using S selected columns of the selected precoding matrix or S reconstructed columns vectors (such as zero-forcing precoding vectors) and at S rates indicated by the feedback information.

The SNRs of the data streams are dependent on (a) the amount of transmit power used for the data streams and (b) the MIMO detection techniques used by the UEs to recover the data streams. For a given MIMO transmission, different SNRs may be achieved with the MMSE, zero-forcing, and SIC techniques. A SU-MIMO UE may perform rank selection and select S data streams that will maximize throughput for that UE. The rank selection may assume that the total transmit power at the Node B is distributed evenly across the S data streams. The SU-MIMO may also use SIC and may be able to achieve higher SNRs for data streams that are recovered later. The SNRs or rates reported by the SU-MIMO UE may thus benefit from rank selection and/or SIC. A MU-MIMO may assume that the total transmit power at the Node B is distributed evenly across T data streams. The MU-MIMO UE may be able to use SIC for only the L data streams sent to that UE. The SNRs or rates reported by the MU-MIMO UE do not benefit from rank selection and may partially benefit from SIC, if at all.

In general, a SU-MIMO UE may generate CQI information with an assumption that data is sent only to that UE on a given set of time and frequency resources. In generating the CQI information, the SU-MIMO UE may employ rank selection, SIC, and/or other techniques that rely on transmission to a single UE. A MU-MIMO UE may generate CQI information with an assumption that data will be sent to that UE as well as other UEs on the same set of time and frequency resources. In generating the CQI information, the MU-MIMO UE may avoid techniques (e.g., rank selection, SIC, etc.) that rely on transmission to a single UE.

When SU-MIMO and MU-MIMO are supported concurrently, there may be ambiguity in interpreting the CQI information received from the UEs. The CQI information may be dependent on the assumptions and the MIMO detection techniques used by the UEs. For example, the SNRs computed by a UE with rank selection and SIC may vary greatly from the SNRs computed by a UE without rank selection or SIC. Good performance may be achieved when the Node B transmits data at appropriate rates so that the data streams can be recovered. If a UE computes SNRs assuming SU-MIMO (e.g., with rank selection and SIC) and if the Node B transmits data to this UE using MU-MIMO, then the rates used for the data streams may be too high, and excessive packet errors may result. Conversely, if a UE computes SNRs assuming MU-MIMO (e.g., without rank selection or SIC) and if the Node B transmits data to this UE using SU-MIMO, then the rates used for the data streams may be too low, and capacity may be wasted.

In an aspect, the UEs are separated into a SU-MIMO group and a MU-MIMO group. Each UE may be placed in either the SU-MIMO group or the MU-MIMO group. In certain scenario, all UEs in a cell or a sector may be placed in the SU-MIMO group at one time and in the MU-MIMO group at another time. The Node B serves only one UE in the SU-MIMO group on a given set of time and frequency resources. The Node B may simultaneously serve multiple UEs in the MU-MIMO group on a given set of time and frequency resources.

The classification of UEs into groups may be based upon various criteria. The UEs may be classified based upon the number of transmit antennas (T) and the number of receive antennas (R). For example, if the Node B has fur transmit antennas then UEs with four (or two) receive antennas may be placed in the SU-MIMO group, and UEs with one (or two) receive antennas may be placed in the MU-MIMO group. A UE with fewer than T antennas may be placed in the MU-MIMO group so that the Node B can transmit up to R data streams to this UE and T-R data streams to other UE(s).

The UEs may also be classified based upon their data requirements. UEs requiring high peak rates or having large amounts of bursty data may be placed in the SU-MIMO group. UEs with low continuous data (e.g., voice) or delay-tolerant data (e.g., background download) may be placed in the MU-MIMO group.

The UEs may also be classified based upon the number of UEs in the sector and/or sector loading. For example, when only a small number of UEs is present, all or many of the UEs may be placed in the SU-MIMO group. Conversely, when a large number of UEs is present, all or many of the UEs may be placed in the MU-MIMO group. More UEs may be placed in the SU-MIMO group when the sector is lightly loaded. Conversely, more UEs may be placed in the MU-MIMO group when the sector is more heavily loaded.

The UEs may also be classified based upon sector goals. Sector capacity may be improved by placing more UEs in the MU-MIMO group. However, in order to meet quality of service (QoS) requirements of the UEs, certain UEs may be placed in the MU-MIMO group and certain other UEs may be placed in the SU-MIMO group.

Table 3 shows some example classification rules for the criteria described above. In general, the UEs may be classified based upon any criterion or any combination of criteria. The classification rules may be static or may vary over time e.g., due to changes in the sector.

TABLE 3

| Criterion | Classification |
| --- | --- |
| Number of Antennas R | Place UEs with more antennas in SU-MIMO group. Place UEs with few antennas in MU-MIMO group. |
| Data requirements | Place UEs with high peak rate or bursty data in SU-MIMO group. Place UEs with low rate or delay-tolerant data in MU-MIMO group. |
| Number of UEs | Place UEs in SU-MIMO group when few UEs are present. Place UEs in MU-MIMO group when more UEs are present. |
| Sector/UE goal | Place UEs in SU-MIMO group to achieve higher peak rate per UE. Place UEs in MU-MIMO group to achieve higher sector capacity. |

In one specific design, the UEs are classified based solely on transmit/receive (Tx/Rx) configuration, which refers to the number of transmit antennas at the Node B and the number of receive antennas at a UE. Table 4 shows a specific classification based solely on Tx/Rx configuration.

TABLE 4

|  | R = 1 | R = 2 | R = 4 |
| --- | --- | --- | --- |
| T = 2 | MU-MIMO | SU-MIMO | SU-MIMO |
| T = 4 | MU-MIMO | MU-MIMO | SU-MIMO |

A T×R configuration means T transmit antennas and R receive antennas for a given UE. The six configurations in Table 4 may be supported as follows:
- 2×1 configuration—two UEs are supported, with one data stream per UE,
- 2×2 configuration—one UE is supported, with two data streams for this UE,
- 2×4 configuration—one UE is supported, with two data streams for this UE,
- 4×1 configuration—four UEs are supported, with one data stream per UE,
- 4×2 configuration—two UEs are supported, with two data streams per UE, and
- 4×4 configuration—one UE is supported, with four data streams for this UE.

The classification of UEs may be semi-static and may change infrequently, if at all. A UE may be classified at the start of a call, upon handover from another Node B, etc. The UE may be notified of the group to which the UE belongs through signaling, which may be sent via higher layer, a broadcast channel, etc. Alternatively, the semi-static group change may also be communicated between the UE and the Node B via a physical or MAC layer indicator. The classification may change in a semi-static way depending on UE preference, UE requirements, channel conditions or long-term channel statistics for the UEs, UE population, sector loading, overall sector conditions, etc. For example, if more UEs are present and/or the sector loading increases, then some or all UEs may be moved from the SU-MIMO group to the MU-MIMO group. As another example, if performance degrades over time for a given UE, then this UE may be switched from the MU-MIMO group to the SU-MIMO group. The UEs may be notified of changes in the groups to which they belong.

The Node B may evaluate operating conditions periodically and may make any necessary adjustments to the groups. Alternatively or additionally, the Node B may evaluate the groups when appropriate, e.g., when new UEs are added, when existing UEs leave, when data requirements and/or conditions change, etc. The change from one group to another group is typically not on a frame-by-frame basis but, rather, is generally less frequent. The length of a frame is typically system dependent and may be 1 millisecond (ms), 10 ms, or some other value.

The scheduler for the Node B may receive feedback information from the UEs and may schedule UEs for downlink transmission based upon the received feedback information. In each scheduling interval, the scheduler may evaluate different UEs for SU-MIMO and different combinations of UEs for MU-MIMO. The scheduler may determine the throughputs achievable for different SU-MIMO UEs and different combinations of MU-MIMO UEs and may determine the gain achievable with MU-MIMO. The scheduler may decide to schedule a single UE with SU-MIMO or multiple UEs with MU-MIMO based upon various factors such as sector capacity (which may favor MU-MIMO), high peak throughput (which may favor SU-MIMO), data requirements, QoS requirements, sector loading, etc. Some of these factors (e.g., sector loading) may change over time and may be different for different time of day. Hence, the scheduling decisions may vary accordingly based upon the underlying factors.

The classification of UEs into groups may provide various advantages. First, scheduling may be simplified by classifying UEs into groups. For example, the scheduler would not need to evaluate SU-MIMO UEs in combination with other UEs. Second, ambiguity in interpreting CQI information may be avoided. The Node B may interpret the CQI information for each UE in accordance with interpretation rules applicable for the group in which the UE belongs. For example, the Node B may interpret CQI information received from a UE in the SU-MIMO group as being generated with rank selection and SIC. The Node B may interpret CQI information received from a UE in the MU-MIMO group as being generated without rank selection or SIC. The classification of UEs into SU-MIMO and MU-MIMO groups may allow for independent design and operation of precoding for SU-MIMO and MU-MIMO to improve performance. A SU-MIMO may select a precoding matrix and column vector(s) out of one set whereas a MU-MIMO UE may select a precoding matrix and column vector(s) out of another set. The number of available precoding matrices or columns may be independently optimized for the SU-MIMO and MU-MIMO groups.

Ambiguity in interpreting CQI information may also be avoided in other manners. For example, a UE may send CQI information as well as one or more signaling bits to indicate which mode (e.g., SU-MIMO or MU-MIMO) was used in generating the CQI information. The Node B may then interpret the received CQI information in accordance with the mode indicated by the signaling bit(s). In any case, proper interpretation of the CQI information allows the Node B to select the proper rate(s) for each scheduled UE.

A SU-MIMO UE may select a precoding matrix and perform rank selection as follows. The UE may evaluate each of the precoding matrices supported by the Node B. For each precoding matrix, the UE may evaluate each of $2^T-1$ possible combinations of columns that may be used for transmission. Each combination corresponds to a specific set of one or more columns in the precoding matrix, and each column may be used for one data stream. For each combination, the UE may (a) distribute the total transmit power across all columns/data streams for that combination, (b) estimate the SNR of each data stream based upon the MIMO detection technique (e.g., MMSE or SIC) used by the UE, and (c) determine the throughput for that combination based upon the SNR estimates for all data streams. The UE may select the combination and precoding matrix that provide the highest throughput.

A MU-MIMO UE may select a precoding matrix and one or more columns of this matrix in similar manner. The UE may evaluate each of the supported precoding matrices. For each precoding matrix, the UE may evaluate each possible combination of columns applicable for the UE, e.g., combinations with L columns. For each combination, the UE may (a) distribute the total transmit power across T columns/data streams, (b) estimate the SNR of each data stream based upon the MIMO detection technique (e.g., MMSE) used by the UE, and (c) determine the throughput for that combination based upon the SNR estimates for all data streams. The UE may select the combination and precoding matrix that provide the highest throughput.

The selection of the precoding matrix and its columns may also be performed in other manners.

Referring to FIG. 1, controllers/processors 280x and 280y may determine which precoding matrix and which L or S columns to use for transmission. Controllers/processors 280x and 280y may also determine the CQI information (e.g., SNRs or rates) for the data streams to be sent with the selected columns of the precoding matrix. Controllers/processors 280x and 280y may generate an uplink message containing feedback information, which may comprise an index for the selected precoding matrix, information indicative of the L or S selected columns, the CQI information, and/or other information (e.g., the channel rank). Controller/processor 240 receives the feedback information from the UEs and determines which precoding matrix and columns (or more generally, which precoding vectors) to use for each UE.

Figure 3:
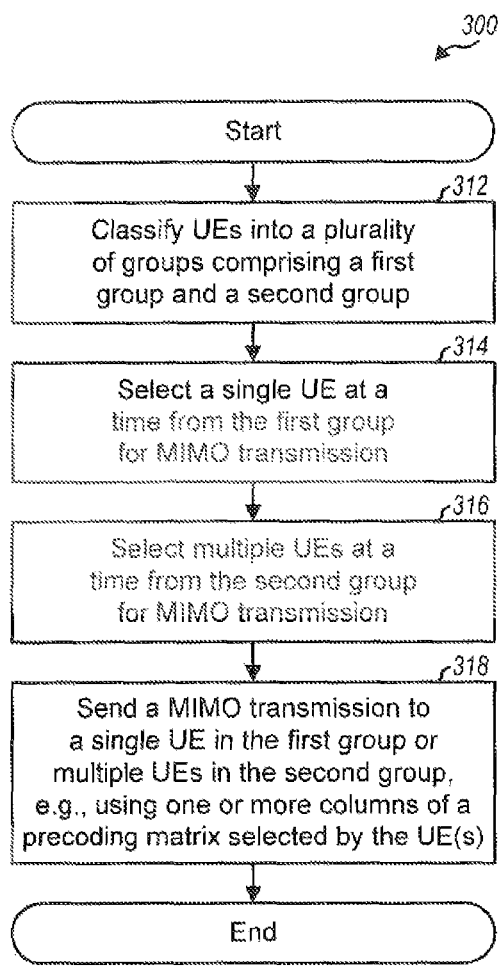
FIG. 3 shows a process for classifying UEs and transmitting data to the UEs.

FIG. 3 shows a process 300 for classifying UEs and transmitting data to the UEs. The UEs are classified into a plurality of groups comprising a first group and a second group (block 312). The first group may include UEs to be scheduled individually for MIMO transmission, i.e., UEs that are not scheduled together on a set of time and frequency resources. The second group may include UEs that can be scheduled together for MIMO transmission, i.e., UEs that can be scheduled together on a set of time and frequency resources. A single UE is selected at a time from the first group for MIMO transmission (block 314). Multiple UEs are selected at a time from the second group for MIMO transmission (block 316).

The classification in block 312 may be performed in various manners. Each UE may be placed in the first group or the second group based upon the number of antennas at the UE and the number of antennas at a Node B. For example, UEs with a single antenna may be placed in the second group, UEs with at least T antennas may be placed in the first group, and UEs with fewer than T antennas may be placed in the second group, where T is the number of antennas at the Node B. The UEs may also be classified based upon loading at the Node B, data and QoS requirements of the UEs, long-term channel statistics, the number of UEs, etc. The classification of the UEs may be semi-static. Changes in operating conditions may be detected (e.g., periodically), and UEs may be reclassified based upon the detected changes in the operating conditions. Signaling may be sent to the UEs to convey the groups to which they belong.

Figure 4:
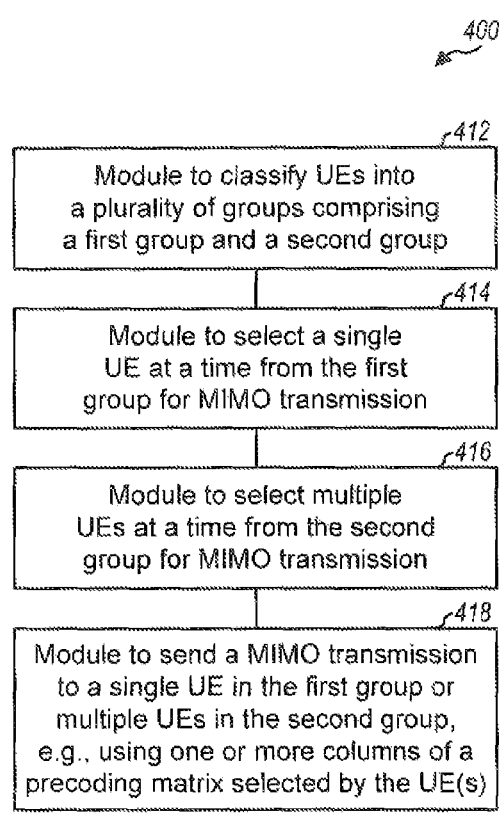
FIG. 4 shows an apparatus for classifying UEs and transmitting data to the UEs.

For blocks 314 and 316, feedback information may be received from the UEs in the first and second groups. The feedback information from each UE may comprise a selected precoding matrix, one or more selected columns of the selected precoding matrix, CQI information, and/or other information. UEs may be scheduled for MIMO transmission based upon the feedback information. For example, multiple UEs selecting different columns of a common precoding matrix may be scheduled together. A MIMO transmission may be sent to a single UE in the first group or multiple UEs in the second group, e.g., using one or more columns of a precoding matrix selected by the UE(s) (block 318). Alternatively, the Node B may send data to multiple UEs using a reconstructed precoding matrix (such as a zero-forcing matrix) obtained based on the matrices and/or columns selected by the UEs FIG. 4 shows an apparatus 400 for classifying UEs and transmitting data to the UEs. Apparatus 400 includes means for classifying the UEs into a plurality of groups comprising a first group and a second group (module 412), means for selecting a single UE at a time from the first group for MIMO transmission (module 414), means for selecting multiple UEs at a time from the second group for MIMO transmission (module 416), and means for sending a MIMO transmission to a single UE in the first group or multiple UEs in the second group, e.g., using one or more columns of a precoding matrix selected by the UE(s) (module 418). Modules 412 to 418 may comprise processors, electronics devices, hardware devices, electronics components, logical circuits, memories, etc., or any combination thereof.

Figures 5, 6:
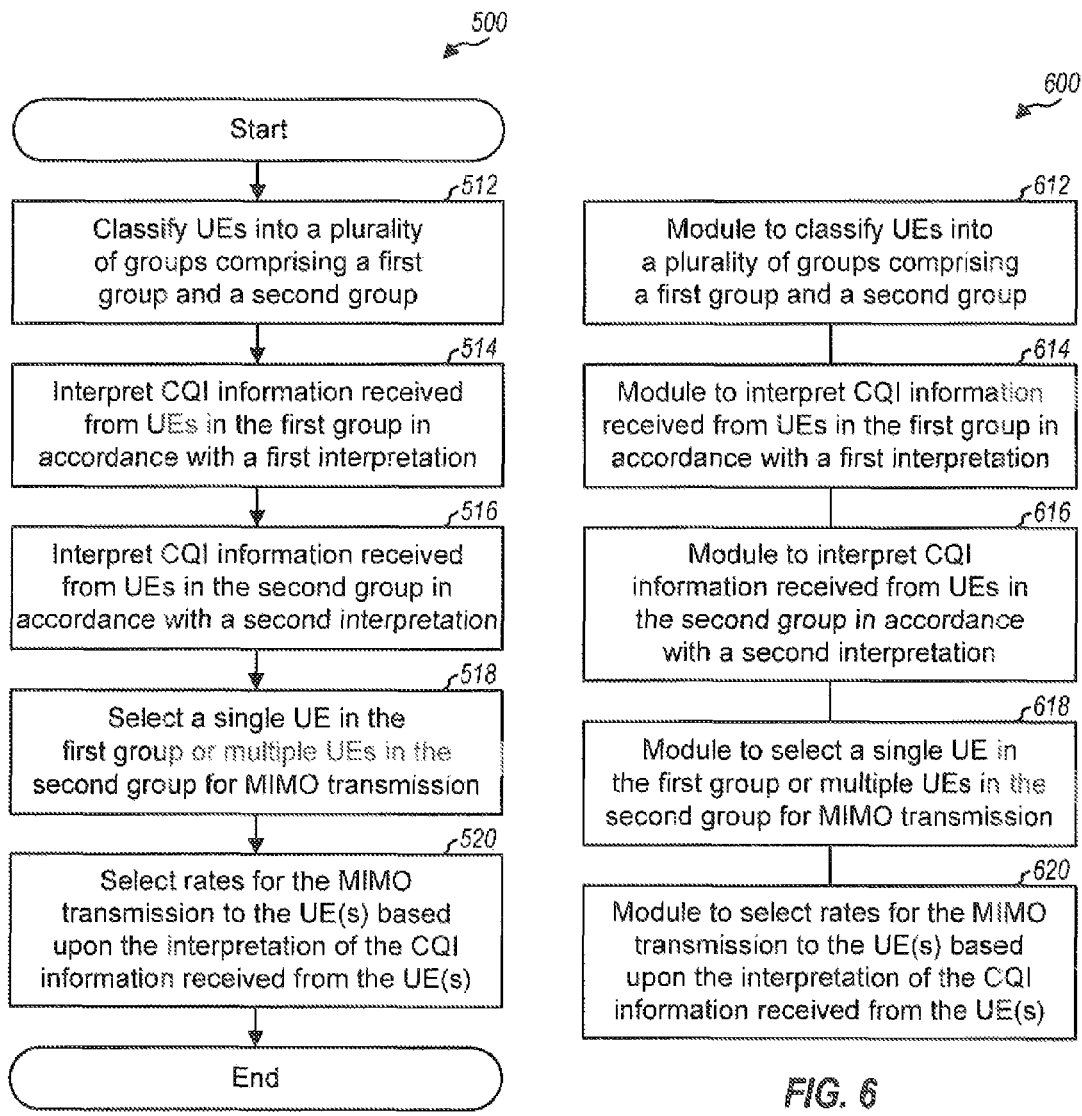
FIG. 5 shows a process for interpreting CQI information from the UEs.
FIG. 6 shows an apparatus for interpreting CQI information from the UEs.

FIG. 5 shows a process 500 for interpreting CQI information. UEs are classified into a plurality of groups comprising a first group and a second group (block 512). CQI information received from the UEs in the first group is interpreted in accordance with a first interpretation (block 514). CQI information received from the UEs in the second group is interpreted in accordance with a second interpretation (block 516). The first interpretation may entail interpreting the CQI information from the UEs in the first group as being generated (a) with the total transmit power at the Node B being distributed across a selected number of data streams, (b) with SIC, (c) with an assumption of data transmission being sent to a single UE, and/or (d) with some other assumptions. The second interpretation may entail interpreting the CQI information from the UEs in the second group as being generated (a) with the total transmit power being distributed across the maximum number of data streams sent by the Node B and/or (b) without SIC.

A single UE in the first group or multiple UEs in the second group may be selected for MIMO transmission (block 518). The rates for the MIMO transmission to the UE(s) may be selected based upon the interpretation of the CQI information received from the UE(s) (block 520).

FIG. 6 shows an apparatus 600 for interpreting CQI information. Apparatus 600 includes means for classifying UEs into a plurality of groups comprising a first group and a second group (module 612), means for interpreting CQI information received from the UEs in the first group in accordance with a first interpretation (module 614), means for interpreting CQI information received from the UEs in the second group in accordance with a second interpretation (module 616), means for selecting a single UE in the first group or multiple UEs in the second group for MIMO transmission (module 618), and means for selecting the rates for the MIMO transmission to the UE(s) based upon the interpretation of the CQI information received from the UE(s) (module 620). Modules 612 to 620 may comprise processors, electronics devices, hardware devices, electronics components, logical circuits, memories, etc., or any combination thereof.

Figure 7:
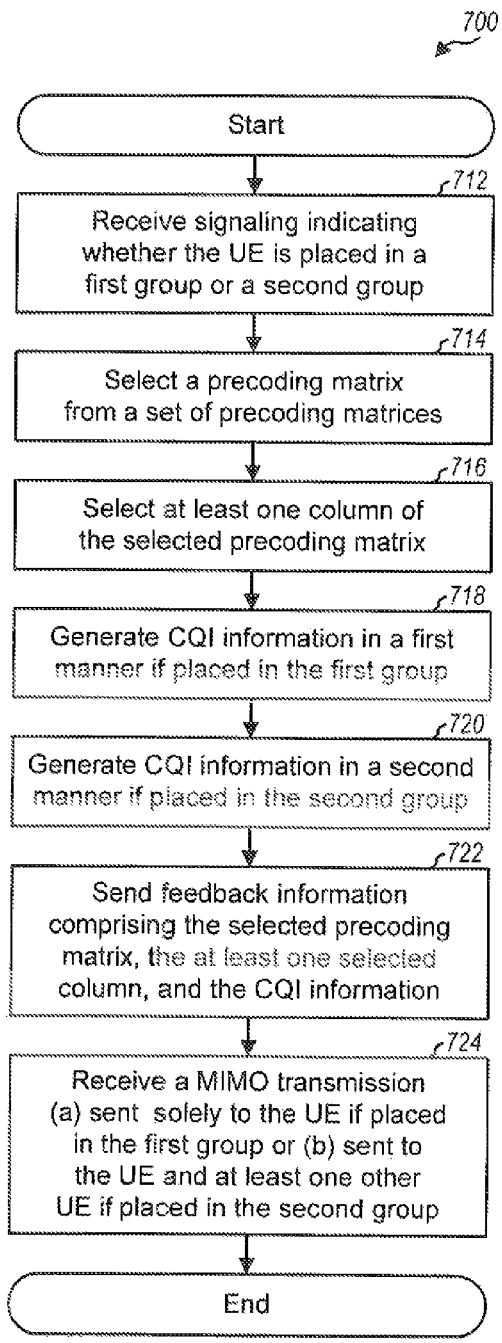
FIG. 7 shows a process performed by a UE.

FIG. 7 shows a process 700 performed by a UE. The UE receives signaling indicating whether the UE is placed in a first group or a second group (block 712). The UE selects a precoding matrix from a set of precoding matrices (block 714) and selects at least one column of the selected precoding matrix (block 716). If the set of available precoding matrices and/or columns is different between the first group and the second group, then the precoding matrix and vector selection may be made in the set corresponding to the group to which the UE belongs. The UE generates CQI information in a first manner if placed in the first group (block 718). The UE generates CQI information in a second manner if placed in the second group (block 720). For example, if placed in the first group, the UE may generate the CQI information by distributing the total transmit power at the Node B across a selected number of data streams and/or with SIC. If placed in the second group, the UE may generate the CQI information by distributing the total transmit power across the maximum number of data streams and without SIC. CQI may also be determined by considering precoding. For example, CQI may be determined for each candidate precoding matrix and column vectors. The UE sends feedback information comprising the selected precoding matrix, the at least one selected column of the selected precoding matrix, and the CQI information (block 722). The UE may receive a MIMO transmission (a) sent solely to the UE if placed in the first group or (b) sent to the UE and at least one other UE if placed in the second group (block 724).

Figure 8:
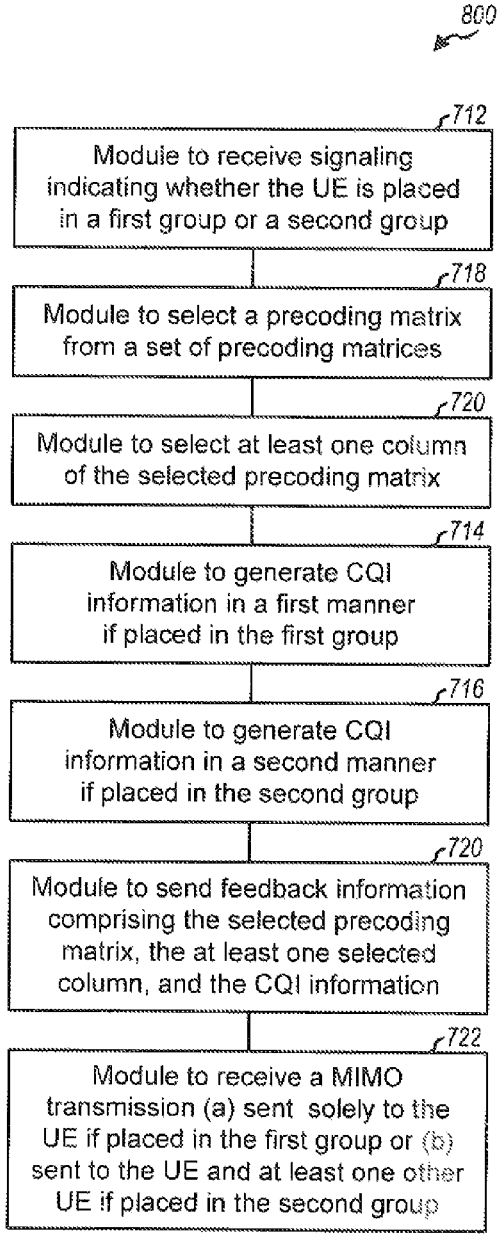
FIG. 8 shows an apparatus for a UE.

FIG. 8 shows an apparatus 800 for an UE. Apparatus 800 includes means for receiving signaling indicating whether the UE is placed in a first group or a second group (module 812), means for selecting a precoding matrix from a set of precoding matrices (module 814), means for selecting at least one column of the selected precoding matrix (module 816), means for generating CQI information in a first manner if placed in the first group (module 818), means for generating CQI information in a second manner if placed in the second group (module 820), means for sending feedback information comprising the selected precoding matrix, the at least one selected column of the selected precoding matrix, and the CQI information (module 822), and means for receiving a MIMO transmission sent solely to the UE or to the UE and at least one other UE (module 824). Modules 812 to 824 may comprise processors, electronics devices, hardware devices, electronics components, logical circuits, memories, etc., or any combination thereof.

The techniques described herein may be implemented by various means. For example, these techniques may be implemented in hardware, firmware, software, or a combination thereof. For a hardware implementation, the processing units at a Node B or a UE may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, techniques may be implemented with modules (e.g., procedures, functions, and so on) that perform the functions described herein. The firmware and/or software codes may be stored in a memory (e.g., memory 242, 282x or 282y in FIG. 2) and executed by a processor (e.g., processor 240, 240x or 240y). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples shown herein but is to be accorded the widest scope consistent with the principles and novel features disclosed herein. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus comprising:
a processor configured to classify user equipments (UEs) into a plurality of groups comprising a first group and a second group, to interpret channel quality indicator (CQI) information received from UEs classified in the first group in accordance with a first interpretation, and to interpret CQI information received from UEs classified in the second group in accordance with a second interpretation, wherein the first group includes UEs to be scheduled individually for multiple-input multiple-output (MIMO) transmission, and wherein the second group includes UEs to be scheduled together for MIMO transmission; and a memory coupled to the processor.

2. The apparatus of claim 1, wherein the processor is configured to interpret the CQI information from the UEs in the first group as being generated with total transmit power at a Node B being distributed across a selected number of data streams, and to interpret the CQI information from the UEs in the second group as being generated with the total transmit power being distributed across a maximum number of data streams sent by the Node B.

3. The apparatus of claim 1, wherein the processor is configured to interpret the CQI information from the UEs in the first group as being generated with successive interference cancellation (SIC), and to interpret the CQI information from the UEs in the second group as being generated without SIC.

4. The apparatus of claim 1, wherein the processor is configured to interpret the CQI information from the UEs in the first group as being generated with an assumption of data transmission to a single UE on a set of time and frequency resources.

5. The apparatus of claim 1, wherein the processor is configured to schedule a single UE in the first group or multiple UEs in the second group for multiple-input multiple-output (MIMO) transmission, and to select rates for the MIMO transmission to the scheduled UE or UEs based upon the interpretation of the CQI information received from the UE or UEs.

6. The apparatus of claim 1, wherein the processor is configured to receive from a UE signaling indicating a group to which the UE belongs.

7. A method comprising:
classifying user equipments (UEs) into a plurality of groups comprising a first group and a second group, the first group including UEs to be scheduled individually for multiple-input multiple-output (MIMO) transmission, the second group including UEs to be scheduled together for MIMO transmission;
interpreting channel quality indicator (CQI) information received from UEs classified in the first group in accordance with a first interpretation; and
interpreting CQI information received from UEs classified in the second group in accordance with a second interpretation.

8. The method of claim 7, wherein the interpreting the CQI information received from the UEs in the first group comprises interpreting the CQI information from the UEs in the first group as being generated with total transmit power at a Node B distributed across a selected number of data streams, and wherein the interpreting the CQI information received from the UEs in the second group comprises interpreting the CQI information from the UEs in the second group as being generated with the total transmit power distributed across a maximum number of data streams sent by the Node B.

9. The method of claim 7, further comprising:
scheduling a single UE in the first group or multiple UEs in the second group for multiple-input multiple-output (MIMO) transmission; and
selecting rates for the MIMO transmission to the scheduled UE or UEs based upon the interpretation of the CQI information received from the UE or UEs.

10. An apparatus comprising:
means for classifying user equipments (UEs) into a plurality of groups comprising a first group and a second group, the first group including UEs to be scheduled individually for multiple-input multiple-output (MIMO) transmission, the second group including UEs to be scheduled together for MIMO transmission;
means for interpreting channel quality indicator (CQI) information received from UEs classified in the first group in accordance with a first interpretation; and
means for interpreting CQI information received from UEs classified in the second group in accordance with a second interpretation.

11. The apparatus of claim 10, further comprising:
means for scheduling a single UE in the first group or multiple UEs in the second group for multiple-input multiple-output (MIMO) transmission; and
means for selecting rates for the MIMO transmission to the scheduled UE or UEs based upon the interpretation of the CQI information received from the UE or UEs.

12. A non-transitory computer-readable medium including instructions stored thereon, comprising:
a first instruction set for classifying user equipments (UEs) into a plurality of groups comprising a first group and a second group, the first group including UEs to be scheduled individually for multiple-input multiple-output (MIMO) transmission, the second group including UEs to be scheduled together for MIMO transmission;
a second instruction set for interpreting channel quality indicator (CQI) information received from UEs classified in the first group in accordance with a first interpretation; and
a third instruction set for interpreting CQI information received from UEs classified in the second group in accordance with a second interpretation.

13. The computer-readable medium of claim 12, and further comprising:
a fourth instruction set for selecting a UE in the first group or multiple UEs in the second group for multiple-input multiple-output (MIMO) transmission; and
a fifth instruction set for selecting rates for the MIMO transmission to the selected UE or UEs based upon the interpretation of the CQI information received from the UE or UEs.

14. An apparatus comprising:
a processor configured to classify user equipments (UEs) into a plurality of groups comprising a first group and a second group, to interpret channel quality indicator (CQI) information received from UEs classified in the first group in accordance with a first interpretation, to interpret CQI information received from UEs classified in the second group in accordance with a second interpretation, to-select a single UE at a time from the first group for multiple-input multiple-output (MIMO) transmission, and to select multiple UEs at a time from the second group for MIMO transmission; and
a memory coupled to the processor.

15. The apparatus of claim 14, wherein the processor is configured to place each of the UEs in the first group or the second group based upon number of antennas at the UE and number of antennas at a Node B.

16. The apparatus of claim 15, wherein the processor is configured to place each UE with a single antenna in the second group.

17. The apparatus of claim 15, wherein the processor is configured to place each UE with at least T antennas in the first group, where T is number of antennas at the Node B, and to place each UE with fewer than T antennas in the second group.

18. The apparatus of claim 14, wherein the processor is configured to classify the UEs into the plurality of groups based upon loading at a Node B.

19. The apparatus of claim 14, wherein the processor is configured to classify each UE based upon data requirements of the UE.

20. The apparatus of claim 14, wherein the processor is configured to determine long-term channel statistics for at least one UE and to classify the at least one UE based upon the long-term channel statistics.

21. The apparatus of claim 14, wherein the processor is configured to classify the UEs into the plurality of groups based upon the number of UEs to be classified.

22. The apparatus of claim 14, wherein the UEs are in a cell or a sector, and wherein the processor is configured to classify all of the UEs in the first group based on a first condition and to classify all of the UEs in the second group based on a second condition.

23. The apparatus of claim 14, wherein the classification of the UEs is semi-static.

24. The apparatus of claim 14, wherein the processor is configured to detect changes in operating conditions and to reclassify selected ones of the UEs based upon the detected changes in the operating conditions.

25. The apparatus of claim 14, wherein the processor is configured to send signaling to the UEs to convey the groups to which the UEs belong.

26. The apparatus of claim 14, wherein the processor is configured to receive feedback information from the UEs, and to select UEs for MIMO transmission based upon the feedback information.

27. The apparatus of claim 26, wherein the feedback information from each UE in the second group identifies a precoding matrix selected from a set of precoding matrices and further identifies at least one column of the selected precoding matrix.

28. The apparatus of claim 14, wherein the processor is configured to select from the second group multiple UEs selecting different columns of a common precoding matrix, and to send a MIMO transmission to the multiple UEs using the common precoding matrix.

29. The apparatus of claim 14, wherein the processor is configured to select from the second group multiple UEs selecting different precoding vectors, and to send a MIMO transmission to the multiple UEs using a reconstructed precoding matrix obtained based on the selected precoding vectors.

30. The apparatus of claim 14, wherein the processor is configured to send a MIMO transmission to a UE in the first group using at least one column of a precoding matrix selected by the UE.

31. A method comprising:
    classifying user equipments (UEs) into a plurality of groups comprising a first group and a second group;
    interpreting channel quality indicator (CQI) information received from UEs classified in the first group in accordance with a first interpretation;
    interpreting CQI information received from UEs classified in the second group in accordance with a second interpretation;
    selecting a single UE at a time from the first group for multiple-input multiple-output (MIMO) transmission; and
    selecting multiple UEs at a time from the second group for MIMO transmission.

32. The method of claim 31, wherein the classifying the UEs comprises
    placing each of the UEs in the first group or the second group based upon number of antennas at the UE and number of antennas at a Node B.

33. The method of claim 31, wherein the classifying the UEs comprises
    classifying the UEs into the plurality of groups based upon loading at a Node B, data requirements of each UE, long-term channel statistics, the number of UEs being classified, or a combination thereof.

34. The method of claim 31, wherein the selecting multiple UEs at a time from the second group for MIMO transmission comprises
    selecting from the second group multiple UEs selecting different columns of a common precoding matrix, and wherein the method further comprises
    sending a MIMO transmission to the multiple UEs using the common precoding matrix.

35. The method of claim 31, wherein the selecting multiple UEs at a time from the second group for MIMO transmission comprises selecting from the second group multiple UEs selecting different precoding vectors, and wherein the method further comprises sending a MIMO transmission to the multiple UEs using a reconstructed precoding matrix obtained based on the selected precoding vectors.

36. An apparatus comprising:
    means for classifying user equipments (UEs) into a plurality of groups comprising a first group and a second group;
    means for interpreting channel quality indicator (CQI) information received from UEs classified in the first group in accordance with a first interpretation;
    means for interpreting CQI information received from UEs classified in the second group in accordance with a second interpretation;
    means for selecting a single UE at a time from the first group for multiple-input multiple-output (MIMO) transmission; and
    means for selecting multiple UEs at a time from the second group for MIMO transmission.

37. The apparatus of claim 36, wherein the means for classifying the UEs comprises means for placing each of the UEs in the first group or the second group based upon number of antennas at the UE and number of antennas at a Node B.

38. The apparatus of claim 36, wherein the means for selecting multiple UEs at a time from the second group for MIMO transmission comprises means for selecting from the second group multiple UEs selecting different columns of a common precoding matrix, and wherein the apparatus further comprises means for sending a MIMO transmission to the multiple UEs using the common precoding matrix.

39. The apparatus of claim 36, wherein the means for selecting multiple UEs at a time from the second group for MIMO transmission comprises means for selecting from the second group multiple UEs selecting different precoding vectors, and wherein the apparatus further comprises means for sending a MIMO transmission to the multiple UEs using a reconstructed precoding matrix obtained based on the selected precoding vectors.

40. A user equipment (UE) comprising:
    a processor configured to generate channel quality indicator (CQI) information in a first manner if the UE is placed in a first group among a plurality of groups, the first group including UEs to be scheduled individually for multiple-input multiple-output (MIMO) transmission, and to generate CQI information in a second manner if the UE is placed in a second group among the plurality of groups, the second group including UEs to be scheduled together for MIMO transmission; and
    a memory coupled to the processor.

41. The UE of claim 40, wherein the processor is configured to generate the CQI information by distributing total transmit power at a Node B across a selected number of data streams if the UE is placed in the first group, and to generate the CQI information by distributing the total transmit power across a maximum number of data streams sent by the Node B if the UE is placed in the second group.

42. The UE of claim 40, wherein the processor is configured to generate the CQI information with successive interference cancellation (SIC) if the UE is placed in the first group, and to generate the CQI information without SIC if the UE is placed in the second group.

43. The UE of claim 40, wherein the processor is configured to select a precoding matrix from a set of precoding matrices, to select at least one column of the selected precoding matrix, and to send feedback information comprising the selected precoding matrix, the at least one selected column of the selected precoding matrix, and the CQI information.

44. The UE of claim 40, wherein the processor is configured to select a precoding matrix from a first set of precoding matrices if the UE is placed in the first group, and to select a precoding matrix from a second set of precoding matrices if the UE is placed in the second group.

45. The UE of claim 40, wherein the processor is configured to receive a MIMO transmission sent solely to the UE if placed in the first group, and to receive a MIMO transmission sent to the UE and at least one other UE if placed in the second group.

46. The UE of claim 40, wherein the processor is configured to receive signaling indicating whether the UE is placed in the first group or the second group.

47. A method comprising:
generating channel quality indicator (CQI) information in a first manner if a user equipment (UE) is placed in a first group among a plurality of groups, the first group including UEs to be scheduled individually for multiple-input multiple-output (MIMO) transmission; and
generating CQI information in a second manner if the UE is placed in a second group among the plurality of groups, the second group including UEs to be scheduled together for MIMO transmission.

48. The method of claim 47, wherein the generating the CQI information in the first manner comprises generating the CQI information by distributing total transmit power at a Node B across a selected number of data streams, or with successive interference cancellation (SIC), or both by distributing the total transmit power across the selected number of data streams and with SIC, and wherein the generating the CQI information in the second manner comprises generating the CQI information by distributing the total transmit power across a maximum number of data streams, or without SIC, or both by distributing the total transmit power across the maximum number of data streams and without SIC.

49. The method of claim 47, further comprising:
selecting a precoding matrix from a set of precoding matrices;
selecting at least one column of the selected precoding matrix; and
sending feedback information comprising the selected precoding matrix, the at least one selected column of the selected precoding matrix, and the CQI information.

50. The method of claim 47, further comprising:
selecting a precoding matrix from a first set of precoding matrices if the UE is placed in the first group; and
selecting a precoding matrix from a second set of precoding matrices if the UE is placed in the second group.

51. An apparatus comprising:
means for generating channel quality indicator (CQI) information in a first manner if a user equipment (UE) is placed in a first group among a plurality of groups, the first group including UEs to be scheduled individually for multiple-input multiple-output (MIMO) transmission; and
means for generating CQI information in a second manner if the UE is placed in a second group among the plurality of groups, the second group including UEs to be scheduled together for MIMO transmission.

52. The apparatus of claim 51, wherein the means for generating the CQI information in the first manner comprises means for generating the CQI information by distributing total transmit power at a Node B across a selected number of data streams, or with successive interference cancellation (SIC), or both by distributing the total transmit power across the selected number of data streams and with SIC, and wherein the means for generating the CQI information in the second manner comprises means for generating the CQI information by distributing the total transmit power across a maximum number of data streams, or without SIC, or both by distributing the total transmit power across the maximum number of data streams and without SIC.

53. The apparatus of claim 51, further comprising:
means for selecting a precoding matrix from a set of precoding matrices;
means for selecting at least one column of the selected precoding matrix; and
means for sending feedback information comprising the selected precoding matrix, the at least one selected column of the selected precoding matrix, and the CQI information.

54. A non-transitory computer-readable medium including instructions stored thereon, comprising:
a first instruction set for classifying user equipments (UEs) into a plurality of groups comprising a first group and a second group;
a second instruction set for interpreting channel quality indicator (CQI) information received from UEs classified in the first group in accordance with a first interpretation;
a third instruction set for interpreting CQI information received from UEs classified in the second group in accordance with a second interpretation;
a fourth instruction set for selecting a single UE at a time from the first group for multiple-input multiple-output (MIMO) transmission; and
a fifth instruction set for selecting multiple UEs at a time from the second group for MIMO transmission.

55. A non-transitory computer-readable medium including instructions stored thereon, comprising:
a first instruction set for generating channel quality indicator (CQI) information in a first manner if a user equipment (UE) is placed in a first group among a plurality of groups, the first group including UEs to be scheduled individually for multiple-input multiple-output (MIMO) transmission; and
a second instruction set for generating CQI information in a second manner if the UE is placed in a second group among the plurality of groups, the second group including UEs to be scheduled together for MIMO transmission.

\* \* \* \* \*